United States Patent [19]

Inaniwa et al.

[11] Patent Number: 4,528,492
[45] Date of Patent: Jul. 9, 1985

[54] BATTERY CHARGER

[75] Inventors: Masahiro Inaniwa; Yoichi Ogawa, both of Katsuta, Japan

[73] Assignee: Hitachi Koki Company, Limited, Tokyo, Japan

[21] Appl. No.: 482,368

[22] Filed: Apr. 5, 1983

[51] Int. Cl.³ .............................................. H02J 7/10
[52] U.S. Cl. ....................................... 320/36; 320/59; 320/DIG. 2
[58] Field of Search ........................ 320/35, 36, 39, 40, 320/57, 59, DIG. 2

[56] References Cited

U.S. PATENT DOCUMENTS

| | | | |
|---|---|---|---|
| 3,917,990 | 11/1975 | Sherman, Jr. | 320/35 |
| 3,935,525 | 1/1976 | Elson et al. | 320/35 |
| 4,006,396 | 2/1977 | Bogut | 320/35 X |
| 4,006,397 | 2/1977 | Catotti et al. | 320/35 X |
| 4,240,022 | 12/1980 | Kilinskis et al. | 320/35 X |
| 4,370,606 | 1/1983 | Kakumoto | 320/35 |
| 4,424,476 | 1/1984 | Mullersman | 320/36 |

Primary Examiner—R. J. Hickey
Attorney, Agent, or Firm—Pollock, VandeSande & Priddy

[57] ABSTRACT

A battery charger comprises a rectifier connected to a source of alternating voltage for generating a rectified sinusoidal halfwave voltage and a thyristor connected in a first circuit between the rectifier and a rechargeable battery for applying the sinusoidal halfwave voltage thereto. An RC triggering network is provided in a second circuit between the battery and the gate of the thyristor for triggering the same into conduction to apply the sinusoidal voltage to the battery when the instantaneous value of the voltage is higher than the voltage of the battery. A temperature responsive switch is provided for disconnecting the second circuit when the battery is heated to a temperature higher than a predetermined value. Further provided is a transistor responsive to the temperature responsive switch for establishing a short-circuit path to the gate of the thyristor.

11 Claims, 2 Drawing Figures

BATTERY CHARGER

BACKGROUND OF THE INVENTION

The present invention relates to battery chargers, and in particular to a battery charger suitable for charging the rechargeable battery of cordless power tools.

Cordless power tools have been extensively used in a wide range of applications because of their utility. The cordless power tool employs a rechargeable battery and therefore a battery charger is required for recharging the battery as often as need arises. Since the rechargeable battery rapidly warms up as it becomes fully charged, conventional battery chargers utilize this temperature characteristic as an indication for terminating charging operations. For this purpose, a temperature sensor is included in battery chargers for detecting the temperature of the battery to terminate the charging operation when that temperature exceeds a preset value. In conventional battery chargers, the temperature sensor is connected in a circuit through which a charging current is fed to the battery. Because of this series connection, the temperature sensor tends to be heated by the passing large current especially when the source voltage and/or ambient temperature is relatively high, and as a result, the sensor is operated in response to its own heat to terminate the charging current before the battery is fully charged. In certain types of the conventional battery charger, the temperature sensor comprises a pair of temperature responsive contacts which are disengaged from contact with each other when the environment reaches a preset temperature. This type of sensor has also a disadvantage in that the switching action of the contacts shortens their lifetime due to arcing which would tend to fuse them together resulting in a battery failure. Furthermore, the conventional battery charger tends to reinitiate charging due to a fluctuation in the input voltage causing overcharge if the charger remains connected to the AC power source after it is fully charged; fails to start charging when the source voltage and/or ambient temperature is low; and is incapable of ensuring a constant amount of charge since charging operation cannot be terminated at precise timing.

SUMMARY OF THE INVENTION

The present invention eliminates the problems associated with prior art battery chargers.

The battery charger of the invention comprises a rectifier connectable in use to a source of alternating voltage for generating a rectified sinusoidal halfwave voltage. First gate-triggered switching means is connected in a first circuit between the rectifier and a rechargeable battery for applying the sinusoidal halfwave voltage thereto. Trigger means is connected in a second circuit between the battery and the gate of the first switching means for triggering the same into conduction to apply the sinusoidal voltage to the battery when the instantaneous value of the voltage is higher than the voltage of the battery. Temperature responsive switching means is provided for disconnecting the second circuit when the battery is heated to a temperature higher than a predetermined value. Further provided is second gate-triggered switching means responsive to the temperature responsive switching means for establishing a short-circuit path to the gate of the first switching means.

Since the temperature responsive switching means is provided in a circuit in which only the gating current is allowed to flow, there is no self-heating of the temperature responsive switching means.

Because of the provision of the second circuit the first gate-triggered switching means is prevented from being triggered into conduction even if the source voltage rises to a higher level during non-charging periods.

The shorting of the gate circuit of the first gate-triggered switching means permits the circuit parameters of the trigger means to be appropriately determined so as to generate a sufficient amount of current to trigger the first gate-triggered switching means, thus allowing the charging circuit to be operated successfully even if the source voltage is relatively low or when the ambient temperature falls to a level where temperature goes low to a level where the first gate-triggered switching means would otherwise become less triggerable. A further advantage of the invention resides in the fact that since the charging operation is terminated exclusively in response to the turn-off of the temperature responsive switching means, the temperature dependent trigger sensitivity of the first gate-triggered switching means has no adverse effect on terminating the charging operation. This ensures that a constant amount of energy be charged on the battery at all times.

BRIEF DESCRIPTION OF THE DRAWINGS

The present invention will be described in further detail with reference to the accompanying drawings, in which.

DETAILED DESCRIPTION

Figure 1:
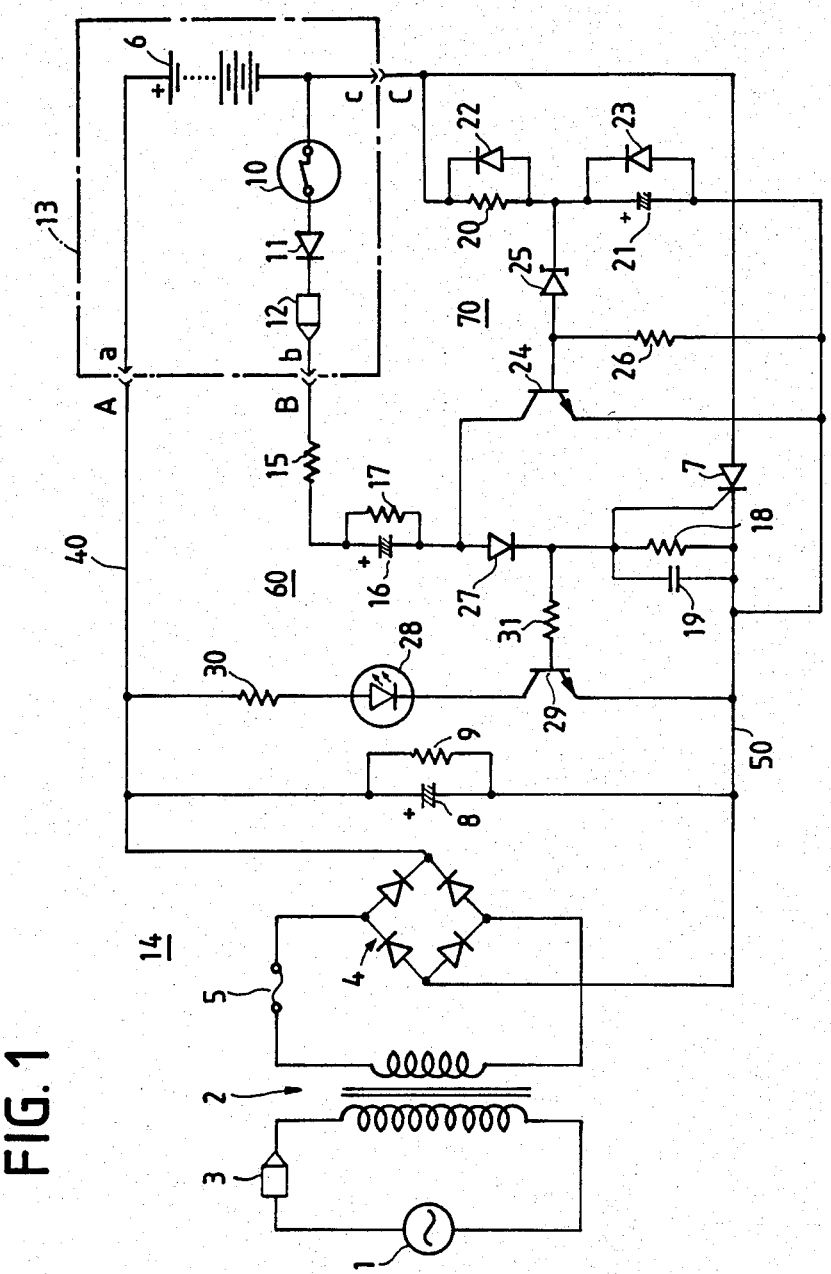
FIG. 1 is a circuit diagram of the present invention.

Referring now to FIG. 1, there is shown a preferred embodiment of an improved battery charger is illustrated. The battery charging circuit shown generally at 14 comprises a step-down transformer 2 having its primary winding connected through a temperature responsive fuse 3 to an AC voltage source 1 and its secondary winding connected through a current fuse 5 to a full-wave rectifier 4. For practical purposes, the rectifier 4 is connected in shunt with a stabilizer comprising a parallel combination of smoothing capacitor 8 and a discharging capacitor 9. The temperature responsive fuse 3 is secured to the transformer to break open the input circuit when the transformer is abnormally heated, and the current fuse 5 is to prevent overcurrent which would occur when the charging circuit is overloaded.

Illustrated at 13 in a chain-dot-line rectangle is a battery casing in which a rechargeable battery 6 to be charged is placed. The battery casing 13 forms part of the charging circuit and includes connecting terminals a, b, c arranged to be connected with mating terminals A, B, C of the charging circuit 14, respectively. The rechargeable battery 6 is connected between the terminals a and c. The casing 13 further includes a temperature switch 10, a diode 11 and a temperature responsive fuse 12 all of which are connected in series between the terminals b and c. The temperature switch 10 has normally open contacts and is arranged to be secured to a side wall of the battery 6 to open the normally closed contacts when the battery 6 is warmed up to a predetermined temperature. The purpose of the diode 11 is to prevent the battery 6 being short-circuited when the terminals a and b are inadvertently contacted with each other. The temperature responsive fuse 12 breaks the charging circuit when the charging circuit has failed and the battery temperature is raised to an abnormally high level.

The full-wave rectifier 4 provides a charging current which is supplied through a positive power line 40 coupled to the terminal A and a negative power line 50 coupled to the terminal C. In the negative power line is provided a first switching element or thyristor 7 having its anode coupled to terminal C and its cathode coupled to the rectifier 4.

Illustrated at 60 is a gating circuit connected from the the gate electrode of the thyristor 7 to the terminals B, b and through the elements 12, 11 and 10 to the negative electrode of the battery 6. The gating circuit 60 includes a current limiting resistor 15, a gate-pulse forming RC network including a capacitor 16 and a resistor 17, and a current-limiting diode 27. Connected between the gate of thyristor 7 and negative line 50 is a noise quenching circuit formed by a parallel circuit of a resistor 18 and a capacitor 19 to absorb gate noise that arises when the thyristor 7 is switched on and off.

Illustrated at 70 is a gate inhibiting circuit formed by a second switching element or transistor 24 having its collector coupled to the gate of thyristor 7 through the diode 27 and its emitter coupled to the thyristor's cathode. The base of transistor 24 is biased by an integrator circuit formed by a series combination of a resistor 20 and a capacitor 21 which are connected between the terminal C and the cathode of thyristor 7 and respectively in shunt with reverse-biased diodes 22, 23. The integrator circuit is connected by a Zener diode 25 to the base of transistor. A resistor 26 is connected across the base and emitter of transistor 24 to develop a bias potential when the charge stored in the integrating capacitor 21 exceeds the breakdown voltage of the Zener diode 25.

As will be described hereinbelow, the full-wave rectifier 4 provides full-wave rectified, non-filtered sinusoidal halfwave pulses on power lines 40 and 50 to the battery 6 and the thyristor 7 is turned on in response to a current generated in the gating circuit 60 when the halfwave pulse exceeds the battery's DC voltage.

A light-emitting diode 28 is provided having its anode coupled by a current limiting resistor 30 to the positive line 40 and its cathode coupled through the collector-to-emitter path of a switching transistor 29 to the negative line 50. The base of transistor is connected by a resistor 31 to the gate of thyristor 7. When the thyristor 7 is turned on, the transistor 29 is biased to activate the LED 28 to indicate that the circuit is charging the battery 6.

Figure 2:
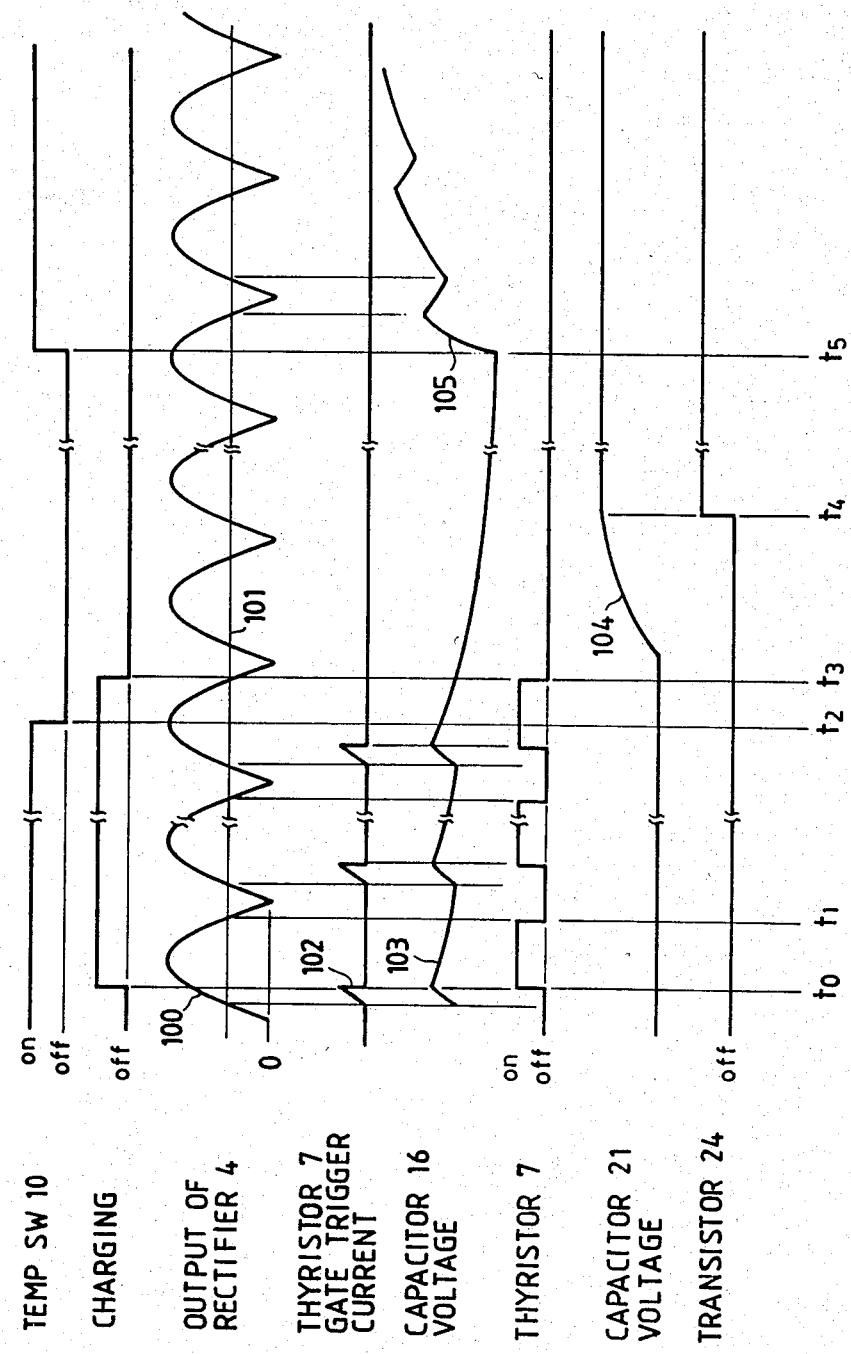
FIG. 2 is a timing diagram useful for describing the operation of the invention.

The operation of the charging circuit will be visualized with reference to the timing diagram of FIG. 2.

When the battery casing 13 is placed into contact with the charging circuit 14 to establish connections between the mating terminals A,a, B,b and C,c, a circuit is established from the rectifier 4 through the positive power line 40, battery 6, gating circuit 60 and through the gate-to-cathode path of thyristor 7 and negative power line 50. When the instantaneous value of a sinusoidal charging voltage developed by the rectifier 4, shown at 100, rises above a battery voltage 101 during each half cycle of the AC voltage, a current flows through the gating circuit 60 to charge the capacitor 16. As a result, a gate current 102 flows through the gate-to-cathode path of thyristor 7. A charge is built up in the capacitor 16, as shown at 103, in response to the gate current 102. When the energy stored in the capacitor 16 reaches the threshold of thyristor 7, the latter is turned on at time $t_0$ to establish a path for the charging current to the battery 6 and the capacitor 16 is discharged through the resistor 17 until the charging voltage 100 rises again above the battery voltage 101. When the halfwave voltage 100 falls below the battery voltage 101, the anode of thyristor 7 is driven to a potential which is insufficient to sustain the conducting state and the thyristor is turned off at time $t_1$. This process is repeated to continue the charging operation until time $t_2$ when the battery 6 has been warmed up to a predetermined temperature (typically at 45° C.) due to the Joule's heat generated by the internal resistance and the heat generated by the reaction of gases and the temperature sensor 10 is operated disconnecting the gating circuit 60. The thyristor 7 will be turned off in response to a lowering of the charging voltage 100 below the battery voltage 101, thus terminating the charging operation at time $t_3$.

Upon the termination of the charging operation, the integrating capacitor 21 starts building up a charge as shown at 104. When the energy stored in the capacitor 21 reaches the breakdown voltage of the Zener diode 25, the switching transistor 24 is biased into conduction at time $t_4$ to provide a short-circuit path across the gate and cathode of thyristor 7 to inhibit the thyristor from responding to a subsequent rise in voltage developed in the capacitor 16, as shown at 105, after the battery 6 has cooled down below the critical temperature which may be detected by sensor 10 at time $t_5$. When this occurs, the capacitor 16 remains fully charged and the resistor 17 serves as a limiter to the current routed to the short-circuit path. The diode 27 provides additional precaution against the undesirable firing of thyristor 7 by developing a forward-biased voltage drop which is sufficient to prevent the collector voltage of transistor 24 from rising above the threshold of the thyristor 7 if the transistor 24 is saturated.

By reason of the circuit configuration just described, the charging current for the battery 6 bypasses the temperature sensing switch 10, so that there is no self-heating of the contacts of switch 10 and hence the fusion of such contacts which might otherwise cause overcharging of the battry 6.

Because of the provision of the gating-inhibit circuit 70 the thyristor 7 is prevented from being triggered into conduction even if the source voltage rises to a higher level during non-charging periods, so that the battery 6 is prevented from being overcharged when the charging operation is resumed. Furthermore, the battery charger of the invention permits the voltage which is developed across the gate and cathode of the thyristor 7 to be used as a control signal for the LED 28. This serves to reduce the number of circuit components required for visual indication of the operation.

The shorting of the gate circuit of the thyristor 7 further provides an advantage in that the circuit parameters of the pulse forming RC network can be appropriately determined so as to generate a sufficient amount of current to trigger the thyristor 7, thus allowing the charging circuit to be operated successfully even if the source voltage is relatively low or when the ambient temperature goes low to a level where the thyristor 7 would otherwise become less triggerable. A further advantage of the invention resides in the fact that since the charging operation is terminated exclusively in response to the turn-off of the temperature sensor 10, the temperature dependent trigger sensitivity of the thyristor 7 has no adverse effect on terminating the charging operation. This ensures that a constant amount of energy be charged on the battery at all times.

The connection of the temperature sensing switch 10 to the negative electrode of the battery 6 allows a reduction in the number of connecting terminals between the circuits 13 and 14, ensuring low manufacturing cost and higher reliability of operation.

The foregoing description shows only a preferred embodiment of the present invention. Various modifications are apparent to those skilled in the art without departing from the scope of the present invention which is only limited by the appended claims. Therefore, the embodiments shown and described are only illustrative, not restrictive.

What is claimed is:

1. A battery charger including a rectifier connected to a source of alternating voltage for generating a rectified sinusoidal halfwave voltage, the charger comprising;

first gate-triggered switching means having an anode connected to a negative pole of a rechargeable battery and a cathode connected to a negative terminal of said rectifier for applying said sinusoidal halfwave voltage to the battery;

trigger means connected between the negative pole of said battery and the gate of said first switching means for triggering the same into conduction to apply said voltage to said battery when the instantaneous value of the sinusoidal voltage is higher than the voltage of said battery;

temperature responsive switching means for disconnecting said trigger means from said battery when said battery is heated to a temperature higher than a predetermined value, indicative of fully charged battery; and second gate-triggered switching means responsive to said temperature responsive switching means establishing a short-circuit path across the cathode and the gate of said first switching means to prevent further charging of the battery after it has been fully charged, notwithstanding a subsequent cooling of the battery below the predetermined value.

2. A battery charger as claimed in claim 1, wherein said trigger means comprises a parallel combination of a capacitor and a resistor.

3. A battery charger as claimed in claim 1, further comprising an RC circuit connected to said battery so that the RC circuit develops a voltage which varies as a function of time in response to said temperature responsive switching means and a breakdown diode connected to said RC circuit for applying said voltage from said RC circuit to the gate of said second switching means.

4. A battery charger as claimed in claim 2, further comprising an RC circuit connected to said battery so that the RC circuit develops a voltage which varies as a function of time in response to said temperature responsive switching means and a breakdown diode connected to said RC circuit for applying said voltage from said RC circuit to the gate of said second switching means.

5. A battery charger as claimed in claim 1, further comprising visual indicating means connected to receive power from said rectifier in response to a voltage derived from a junction between said trigger means and the gate of said first switching means.

6. A battery charger as claimed in claim 2, further comprising visual indicating means connected to receive power from said rectifier in response to a voltage derived from a junction between said trigger means and the gate of said first switching means.

7. A battery charger as claimed in claim 3, further comprising visual indicating means connected to receive power from said rectifier in response to a voltage derived from a junction between said trigger means and the gate of said first switching means.

8. A battery charger as claimed in claim 4, further comprising visual indicating means connected to receive power from said rectifier in response to a voltage derived from a junction between said trigger means and the gate of said first switching means.

9. A battery charger as claimed in claim 1, further comprising a casing in which said battery and said temperature responsive switching means are disposed, said casing including a first terminal connecting one electrode of said battery to one terminal of said rectifier, a second terminal connecting the other electrode of said battery to the other terminal of said rectifier, and a third terminal connecting said temperature responsive switching means to said trigger means, said temperature responsive switching means being electrically connected to said second terminal.

10. A battery charger as claimed in claim 9, wherein said casing further includes a temperature responsive fuse for disconnecting said trigger means when said battery is heated to an abnormally high temperature.

11. A battery charger as claimed in claim 2, further comprising a diode connected to said trigger means between said parallel combination of resistor and capacitor and the gate of said first switching means in a sense that forward biases the diode.

* * * * *